United States Patent [19]

Young

[11] Patent Number: 4,944,787

[45] Date of Patent: Jul. 31, 1990

[54] THERMALLY STABLE UREA-SULFURIC ACID COMPOSITIONS AND METHODS OF MANUFACTURE

[75] Inventor: Donald C. Young, Fullerton, Calif.

[73] Assignee: Union Oil Company of California, Los Angeles, Calif.

[21] Appl. No.: 673,508

[22] Filed: Nov. 20, 1984

Related U.S. Application Data

[63] Continuation-in-part of Ser. No. 442,296, Nov. 11, 1982, abandoned, which is a continuation-in-part of Ser. No. 318,629, Nov. 5, 1981, Pat. No. 4,445,925.

[51] Int. Cl.$^5$ .............................................. C05C 9/00
[52] U.S. Cl. ...................................... 71/28; 71/64.08; 71/64.10; 564/39
[58] Field of Search .................... 71/28, 64.08, 64.10; 564/39, 73

[56] References Cited

U.S. PATENT DOCUMENTS

| | | | |
|---|---|---|---|
| 4,116,644 | 9/1978 | Jones | 71/549 |
| 4,214,888 | 7/1980 | Young | 71/28 |
| 4,315,763 | 2/1982 | Stoller et al. | 71/29 |
| 4,318,343 | 11/1979 | Verdegaal et al. | 71/28 |
| 4,397,675 | 8/1983 | Young | 71/28 |
| 4,402,852 | 9/1983 | Young | 252/182 |
| 4,404,116 | 9/1983 | Young | 252/182 |
| 4,445,925 | 5/1984 | Young | 71/28 |
| 4,447,253 | 5/1984 | Young | 71/28 |
| 4,512,813 | 4/1985 | Young | 134/27 |

OTHER PUBLICATIONS

Donald C. Young, U.S. patent application Ser. No. 673,358, filed 11-20-84, for Methods for Hydrolyzing Polysaccaharides and Compositions Useful Therein.

Donald C. Young, U.S. patent application Ser. No. 673,359, filed 11-20-84, for Methods for Chemically Reducing Nitrogen Oxide Emissions.

Donald C Young, U.S. patent application Ser. No. 675,774, filed 11-28-84 for Methods for Removing Obstructions From Conduits.

Donald C. Young, U.S. patent application Ser. No. 679,235, filed 12-7-84 for Methods for Cleaning Materials.

Doanld C. Young, U.S. patent application Ser. No. 688,689, filed 1-3-85 for Pesticidal Compositions and Methods for Controlling Pests.

Donald C. Young, U.S. patent application Ser. No. 442,296, filed 11-17-82 for Systemic Herbicidal Compositions and Methods of Use.

Donald C. Young, U.S. patent application Ser. No. 444,667, filed Nov. 26, 1982 for Methods for Controlling Vegetation.

Donald C. Young, U.S. patent application Ser. No. 453,282, filed 12-27-82 for Methods for Selectively Controlling Plant Suckers.

Donald C. Yound, U.S. patent application Ser. No. 453,496, filed 12-27-82 for Acid-Catalyzed Reactions and Compositions for Use Therein.

Donald C. Yound, U.S. patent application Ser. No. 455,268, filed 1-3-83 for Cellulosic Compositions and Methods for Treating Cellulosic Materials.

Danald C. Young, U.S. patent application Ser. No. 455,317, filed 1-3-83 for Plant Seed Compositions and Methods for Treating Plant Seeds.

D. F. du Toit, Verslag Adad.Wetenschappen, 22, 573-4 (Abstracted in Chemical Abstracts, 8, 2346, 1914).

L. H. Dalman "Ternary Systems of Urea and Acids, I. Urea, Nitric Acid and Water, II. Urea Sulfuric Acid and Water, III. Urea, Oxalic Acid and Water"; JACS, 56, 549-53 (1934).

Sulfur Institute Bulletin No. 10 (1964), "Adding Plant Nutrient Sulfur to Fertilizer".

*Primary Examiner*—Ferris H. Lander
*Attorney, Agent, or Firm*—Gregory F. Wirzbicki; Michael H. Laird

[57] ABSTRACT

This invention provides thermally stable urea-sulfuric acid compositions and methods for manufacturing and using such compositions. The novel compositions comprise combinations of urea and sulfuric acid which contain less than about one weight percent water based on the combined weight of urea and sulfuric acid. Such compositions are substantially more stable thermally than are compositions which contain more than about one weight percent water.

The thermally stable compositions are prepared by forming the urea-sulfuric acid component in the presence of less than one weight percent water based on the combined weight of urea and sulfuric acid and/or by physically and or chemically removing water from the urea-sulfuric acid component. Water can be removed by evaporation and/or by contacting the urea-sulfuric acid component, either during or after its formation, with one or more chemical dehydrating agents capable of chemically combining with water in the composition.

78 Claims, No Drawings

THERMALLY STABLE UREA-SULFURIC ACID COMPOSITIONS AND METHODS OF MANUFACTURE

RELATED APPLICATIONS

This application is a continuation-in-part of my copending application Ser. No. 442,296, SYSTEMIC HERBICIDAL COMPOSITIONS AND METHODS OF USE, filed Nov. 11, 1982, and now abandoned which, in turn, was a continuation-in-part of my application Ser. No. 318,629, METHODS OF PRODUCING CONCENTRATED UREA-SULFURIC ACID REACTION PRODUCTS, filed Nov. 5, 1981, now U.S. Pat. No. 4,445,925.

BACKGROUND OF THE INVENTION

This invention relates to the field of urea-sulfuric acid compositions and to methods for manufacturing such compositions.

Description Of The Art

Both urea and sulfuric acid are well known and are widely used in numerous industries for fertilizers, soil adjuvants, chemical treating agents, chemical precursors and reactants and a variety of other uses. Urea and sulfuric acid are sometimes useful in combination, particularly in the agricultural industry when simultaneous addition of urea and sulfur to the soil is desired.

It is also known that urea and sulfuric acid will combine to form adducts including the monourea-sulfuric acid adduct and the diurea-sulfuric acid adduct. D. F. du Toit, Verslag Akad. Wetenschappen, 22, 573-4 (abstracted in Chemical Abstracts, 8, 2346, 1914) disclosed that urea forms certain compounds with oxalic, acetic, hydrochloric, nitric, and sulfuric acids. L. H. Dalman, "Ternary Systems of Urea and Acid. I. Urea, Nitric Acid and Water. II. Urea, Sulfuric Acid and Water. III. Urea, Oxalic Acid and Water"; JACS, 56, 549-53 (1934), disclosed the phase relationships between the solid phase and saturated solutions containing urea and sulfuric acid at 10° C. and 25° C. The Sulfur Institute in Sulfur Institute Bulletin No. 10 (1964), "Adding Plant Nutrient Sulfur to Fertilizer", disclosed that urea reacts with sulfuric acid to form two complexes of "urea sulfate" which are useful fertilizers. Methods of manufacturing certain combinations of urea and sulfuric acid are disclosed by Verdegaal et al. in U.S. Pat. No. 4,310,343 and by Jones in U.S. Pat. No. 4,116,664.

While Dalman stated that the urea-sulfuric acid components which he obtained were "anhydrous," he was evidently referring to the fact that such components are not hydrates since he was unable to obtain urea-sulfuric acid components which contained less than 1.3 weight percent water (Dalman, op. cit. page 553, column 1). with particular reference to the water concentration of the urea-sulfuric components which he obtained, Dalman observed that, as the water concentration of the urea-sulfuric acid component is reduced toward the zero water level, the compositions become more and more viscous, and that it is this condition which accounts for the high percentages of water found in Dalman's analyses of those components. According to Dalman, it was quite impossible to free the urea-sulfuric acid components satisfactorily from the "sirupy mother liquor." In addition, Dalman observed that the "salts" (mono- and diurea sulfuric acid adducts), particularly the "mono-urea-sulfate," are deliquescent and that they rapidly adsorb moisture from the atmosphere and other environments.

Urea-sulfuric acid components have a wide variety of utilities in addition to those discussed in the references mentioned above. For instance, certain urea-sulfuric acid components are useful for a variety of agricultural purposes, as contact herbicides, as components of systemic herbicides, as components of compositions for treating wooden articles, cellulose, plant seeds and food products, and as catalysts for a variety of acid-catalyzed reactions as disclosed in my applications Ser. Nos. 442,296, supra; 318,629, supra; 444,667, Methods for Controlling Vegetation, filed November 26, 1982; 453,282, Methods for Controlling Plant Suckers, filed Dec. 27, 1982; 453,496, Acid-Catalyzed Reactions and Compositions for Use Therein, filed Dec. 27, 1982; 455,268, Cellulosic Compositions and Methods for Treating Cellulosic Materials, filed Jan. 3, 1983; 455,317, Plant Seed Compositions and Methods for Treating Plant Seeds, filed Jan. 3, 1983; 482,942, Methods for Treating Wooden Articles, filed Apr. 7, 1983; and 537,087, Methods for Reducing Nitrogen Oxide Emissions, filed Sept. 29, 1983, all of which are incorporated herein by reference.

The use of urea-sulfuric acid components in a variety of these utilities is limited by the susceptibility of the urea-sulfuric acid components to thermal decomposition at relatively low temperatures. As disclosed in my application Ser. No. 318,629, urea-sulfuric acid components which have urea-sulfuric acid molar ratios of about two or higher begin to decompose at temperatures as low as 159° F. (about 70° C.), while urea-sulfuric acid components which have urea-sulfuric acid molar ratios of about one or less begin to decompose at temperatures of at about 176° F. (80° C.).

As discussed in my above noted copending applications, I have discovered that such decomposition, herein referred to as incipient decomposition, often results in the formation of undesirable by-products such as ammonium sulfamate, sulfamic acid, ammonium sulfate, and other products of the thermal decomposition of urea and/or sulfuric acid. It also results in the destruction of sulfuric acid and urea and the consequent reduction in total acidity of the composition. Such incipient decomposition is also exothermic. Thus, it complicates heat removal and temperature control in manufacturing methods and methods of use which involve exposure of the urea-sulfuric acid components to elevated temperatures.

The decomposition of the urea-sulfuric acid components becomes explosive at even higher temperatures of about 190° F. At such temperatures, the thermal decomposition reactions become uncontrollable, and it is virtually impossible to remove heat from the system fast enough to prevent explosive decomposition.

Accordingly, a need exists for more thermally stable urea-sulfuric acid components, compositions containing such components, and methods for manufacturing such components and compositions.

SUMMARY OF THE INVENTION

Briefly, the invention provides thermally stable urea-sulfuric acid compositions and methods for manufacturing such compositions. Methods of using such urea-sulfuric acid compositions at temperatures in excess of 176° F. (80° C.) are also provided.

The novel, thermally stable urea-sulfuric acid compositions comprise urea and sulfuric acid and less than one weight percent water based on the combined weight of urea and sulfuric acid. The novel manufacturing methods of this invention involve procedures for producing the novel urea-sulfuric acid compositions and include methods for manufacturing such compositions directly from urea and sulfuric acid as well as procedures for reducing the water content of water-containing urea-sulfuric acid compositions. The novel urea-sulfuric acid compositions can be manufactured directly from urea and sulfuric acid which contain less than one weight percent water based on the combined weight of urea and sulfuric acid. Alternatively, one or more chemical dehydrating agents can be introduced to the urea-sulfuric acid reaction in amounts which are sufficient to assure the presence of less than one weight percent "free" water in the product. In another embodiment, water can be removed from urea-sulfuric acid components which contain more than one weight percent water to reduce the water content of the combination to less than about one weight percent. Water removal can be effected by evaporation under the influence of heat and/or vacuum, by the addition of chemical dehydrating agents which are capable of removing "free" water from the system, by extraction with hydrophilic solvents, or by combinations of such procedures.

DETAILED DESCRIPTION OF THE INVENTION

This invention provides novel thermally stable urea-sulfuric acid compositions, methods for manufacturing such thermally stable urea-sulfuric acid compositions, and methods for using the thermally stable urea-sulfuric acid compositions. The stable compositions are particularly useful in methods which involve temperatures above those which promote the thermal decomposition of urea-sulfuric acid compositions which contain substantially more than 1 weight percent water.

I have found that urea-sulfuric acid components, and/or compositions containing such components, which contain less than about one weight percent water based on the combined weight of urea and sulfuric acid are much more stable thermally than are compositions which contain significantly more than one weight percent water. I have also found that such stable urea-sulfuric acid components can be produced from reactants which contain less than one weight percent water and/or which contain dehydrating agents capable of removing water from the reactants and/or products and/or by removing water from urea-sulfuric acid components, or from compositions containing such components, which contain more than one weight percent water. Water can be removed by evaporation, by the addition of chemical dehydrating agents, or by combinations of such procedures.

The novel methods and compositions of this invention have numerous advantages over urea-sulfuric acid compositions and methods of manufacture and use which are otherwise known. The compositions of this invention are more stable thermally and thus can be manufactured, stored and used at higher temperatures than can be employed with other compositions. Furthermore, the urea-sulfuric acid components of this invention are less hydroscopic, especially when the urea sulfuric acid molar ratio of the composition is about one or more. In this regard, I have discovered that the novel urea-sulfuric acid compositions adsorb or otherwise assimilate water from the environment at a much slower rate than do urea-sulfuric acid components which contain substantially more than one weight percent water. The urea-sulfuric acid compositions of this invention which contain an excess amount of chemical dehydrating agent, i.e., an amount of dehydrating agent in excess of the amount of water initially present in the composition, are even more thermally stable and retain their stability for longer periods of time even when exposed to conditions which may introduce water into the composition.

Due to the reduced water weight of these compositions, they are more economical to manufacture, transport, and use in many applications. The solid compositions have many advantages associated with their stability as solids, and they can be employed as prills, powders, pellets, and in other solid forms which have no effective viscosity. Thus, they can be air applied for agricultural purposes, they can be air conveyed for manufacturing, use, and or shipment, and they can be handled otherwise as relatively non-hydroscopic solid materials.

The novel compositions can be either liquids, solids, or melts of the described urea-sulfuric acid components or of compositions containing such components. The liquid compositions can consist essentially of mixtures of urea and sulfuric acid or they can involve solutions of the described urea-sulfuric acid components in non-aqueous solvents. Similarly, the solid and molten compositions of this invention can comprise the described urea-sulfuric acid components alone or combinations of such components with other materials.

The novel urea-sulfuric acid compositions contain about one weight percent water or less, preferably about 0.5 weight percent water or less, and most preferably about 0.2 weight percent water or less based on the combined weight of urea and sulfuric acid. The compositions of this invention which are most stable thermally and which are the least hydroscopic are those which contain essentially no free water and which also contain a chemical dehydrating agent.

The novel compositions can contain essentially any amount of urea and sulfuric acid although the urea and sulfuric acid, in combination, will usually constitute at least about 10 weight percent, generally at least about 50 weight percent, and often at least about 80 weight percent of the composition. Typically, the urea and sulfuric acid, in combination, will constitute about 10 to 100 and often about 20 to 100 weight percent of the composition.

The relative proportions of urea and sulfuric acid are conveniently expressed in terms of the urea-sulfuric acid molar ratio. Essentially any relative proportions of urea and sulfuric acid can be employed. However, the novel compositions will generally have urea-sulfuric acid molar ratios of about 0.1 to about 50, often about 1/10 to about 10/1. Preferred compositions have urea-sulfuric acid molar ratios of at least about 0.5, generally at least about 1, and most often about 1 to about 10. Compositions which contain a significant proportion of the monourea adduct of sulfuric acid are particularly preferred for some utilities, and these are characterized by urea-sulfuric acid molar ratios of about ¼ to about 7/4, generally about ½ to about 7/4, and preferably about 1/1 to about 3/2. The range of about 1/1 to about 3/2 is particularly preferred when it is desired that the composition contains a substantial portion of the monourea adduct and that all of the sulfuric acid be complexed with urea either as the mono- or diurea adduct. While the solid compositions can contain sulfuric acid which is not complexed with urea, it is presently preferred that all of the sulfuric acid in such solid compositions be complexed with urea as either the mono- or diurea adduct. Accordingly, in these preferred solid compositions, the urea-sulfuric acid molar ratio is at least about 1/1 and generally about 1/1 to about 100/1. Particularly preferred compositions for some utilities comprise those in which all of the sulfuric acid is complexed with urea and which contain no excess urea. In such compositions the urea-sulfuric acid molar ratio will be within the range of about 1/1 to about 2/1.

Urea-sulfuric acid compositions having the described water concentrations and urea-sulfuric acid molar ratios are characterized by incipient decomposition temperatures above 176° F. (80° C.), generally at least about 194° F. (90° C.), and preferably at least about 212° F. (100° C.).

The novel compositions of this invention can comprise a variety of other components in addition to the described urea-sulfuric acid components. Particularly preferred compositions contain chemical dehydrating agents and/or surfactants. Chemical dehydrating agents are particularly preferred since their use assures that the water content of the urea-sulfuric acid component is reduced to and maintained at a level of about one weight percent or less. Such chemical dehydrating agents can comprise either organic or inorganic materials which are capable of reacting with water in the presence of the urea-sulfuric acid component to reduce the water content of the composition to about one weight percent or less based on the combined weight of urea and sulfuric acid. Illustrative inorganic dehydrating agents are polyphosphoric acid, $SO_3$, fuming sulfuric acid, sulfur chlorides such as $SCl_4$ and $SCl_2$, thionyl compounds such as $SOCl_2$, $SOBr_2$, thionyl phosphide, thionyl arsenids, alkyl and aryl thionyl halides, phosphorus pentoxide ($P_2O_5$), and the like. Illustrative organic dehydrating agents are organic sulfur chlorides such as alkyl and aryl thiol chlorides, organic thio compounds such as organic thioacid anhydrides, e.g., thioacetic anhydride, and carboxylic acid anhydrides such as acetic anhydride, phthalic anhydride, and the like.

Surfactants are also sometimes desirable components of the compositions of this invention. Surfactants increase the affinity of the described urea-sulfuric acid components for hydrophobic materials such as oils and other organic compositions. Illustrative surfactants and various utilities for surfactant-containing compositions are described in my co-pending application Serial No. 453,496, supra.

A variety of other components can be combined with the described urea-sulfuric acid components including solid or liquid fillers, diluents, solvents, plant nutrients, organic and/or inorganic reactants, and the like, which may be either organic or inorganic compounds or mixtures of such compounds. Illustrative of such other components are phosphoric acid, ammonium phosphate, ammonium polyphosphate, ammonium sulfate, ammonium chloride, metals and organic and inorganic metal-containing compounds, non-aqueous, polar organic and inorganic solvents in which both urea and sulfuric acid are soluble such as dimethyl sulfoxide (DMSO), methanol, glycol, acetone, methylethyl ketone (MEK), tetrahydrofuran, halogenated hydrocarbons, e.g., trichloromethane, and the like.

The methods of this invention involve the manufacture of the described thermally stable urea-sulfuric acid compositions by either (1) physically or chemically removing water from water-containing urea-sulfuric acid components, (2) forming the described urea-sulfuric acid component from substantially anhydrous urea and sulfuric acid reactants, and/or (3) reacting urea and sulfuric acid reactants which contain more than about one weight percent water (based on the combined weight of urea and sulfuric acid) in the presence of an amount of a chemical dehydrating agent sufficient to reduce the effective water content of the resulting composition to the prescribed level. Two or more of such procedures can be employed concurrently or sequentially if desired.

Physical water removal is effected by the use of elevated temperatures, vacuum, solvent extraction, or a combination of these. For instance, the described, thermally stable urea-sulfuric acid components can be obtained by heating a urea-sulfuric acid component which contains more than one weight percent water at an elevated temperature for a sufficient period of time to reduce the water content to less than one weight percent. The starting material can be either solid, liquid, or molten, and can be a combination of the urea-sulfuric acid component, water, and other materials.

Heating is preferably, although not necessarily, carried out under vacuum, since vacuum accelerates the rate of water removal from the composition. Higher temperatures produce more rapid and more thorough water removal, the only limitation being that temperature should not exceed the thermal decomposition temperature. In this regard, I have discovered that the thermal decomposition temperature increases as the water content of the urea-sulfuric acid component is reduced to relatively low levels, e.g. less than 5 weight percent, preferably less than 3 weight percent water based on the combined weight of urea and sulfuric acid. Thus, compositions which have very low water concentrations can be heated to higher temperatures without decomposing.

Compositions which have urea/sulfuric acid molar ratios of 2 or more and which contain substantially more than 1 weight percent water (based on the combined weight of urea and sulfuric acid) have incipient decomposition temperatures of about 159° F. (at which they begin to decompose), and they decompose explosively at about 196° F. The incipient and explosive decomposition temperatures of various urea-sulfuric compositions, and procedures for determining such decomposition temperatures, are discussed in my application Ser. No. 318,629, supra. Compositions which have urea/sulfuric acid molar ratios below about 2 and which contain substantially more than 1 weight percent water typically have incipient decomposition temperatures of about 176° F., and they also decompose explosively at about 196° F.

Urea-sulfuric acid components can be dehydrated in accordance with this invention at temperatures above their respective incipient decomposition temperatures and below the temperature at which they decompose explosively. However, temperatures below the incipient decomposition temperature are presently preferred since higher temperatures cause the exothermic formation of decomposition products which complicates temperature control and forms impurities in the product.

Accordingly, urea-sulfuric acid components containing about 5 weight percent water or more and having urea-sulfuric acid molar ratios of about 2 or more are preferably heated at any temperature up to about 159° F., usually about 120° to about 150° F., until the water concentration is reduced to less than 5 weight percent. At that point, if desired, the temperature can be gradually increased as water content is decreased so that drying temperatures of 170° to 200° F. and higher can be employed for the final stages of dehydration when the water content is about one weight percent or less. Higher initial temperatures can be employed for dehydrating compositions having urea-sulfuric acid molar ratios below 2 without causing decomposition. Such compositions typically have incipient decomposition temperatures of about 176° F. at water concentrations substantially above 1 weight percent. With these compositions also, drying temperature can be gradually elevated, if desired, as water concentration is reduced as described above. Typical final drying temperatures which can be employed with compositions having urea-sulfuric acid molar ratios of about 2 or less are, for example, 190° to 220° F. or higher.

Heating should be continued for a period of time sufficient to achieve the desired water level reduction. Typically, this will require heating for at least about 5 hours, generally for about 5 to about 40 hours, and most often about 5 to about 10 hours. Longer drying times are required for compositions having higher initial water vacuum accelerate water removal.

Vacuum dehydration can be achieved by treating a urea-sulfuric acid composition containing more than 1 weight percent water at a sufficiently low vacuum for a period of time sufficient to reduce the water content to about 1 weight percent or less. Higher vacuums increase drying rate and are presently preferred. Thus, the composition to be dehydrated is preferably treated at a pressure of about 100 mm Hg, more preferably about 50 mm Hg absolute or less for at least about 1 hour, preferably at least about 4 hours.

In accordance with another embodiment, the thermally stable compositions of this invention can be obtained by treating a water-containing urea-sulfuric acid component with one or more of the chemical dehydrating agents referred to above. The dehydrating agent is added in an amount sufficient to reduce the water content to the desired level. In one class of preferred compositions, the chemical dehydrating agent is added in an amount in excess of the stoichiometric amount required to react with all of the water present in order to provide a residual quantity of the dehydrating agent in the finished composition. The presence of active dehydrating agent in the finished composition provides a reservoir of material which can react with water adsorbed from the environment and serves to preserve the stability of the composition.

The amount of chemical dehydrating agent required to obtain the desired final water content in any particular instance can be determined from the initial water content of the urea-sulfuric acid component and the nature of the reaction which the dehydrating agent undergoes with water. For instance, water reacts with ammonium polyphosphate and polyphosphoric acid to depolymerize such compounds. Thus, one mole of water will react with each mole of polymerized phosphoric acid in either of those compositions. Similarly, one mole of water reacts with each mole of sulfur trioxide added to the composition to form sulfuric acid. Fuming sulfuric acid contains "excess" $SO_3$ which reacts with water to produce sulfuric acid Thus, amounts of fuming sulfuric acid which correspond with one mole of excess $SO_3$ should be employed to react with each mole of water in the composition. One mole of water also can be removed from the composition by the addition of one mole of either of sulfur monochloride, sulfur dichloride, thionyl chloride, and/or organic anhydrides.

The chemical dehydrating agent, or mixtures of such agents, can be added to the preformed urea-sulfuric acid component and/or to compositions containing such components. In the alternative, the chemical dehydrating agent can be incorporated into the composition during formation of the urea-sulfuric acid component by admixture with the urea and sulfuric acid reactants or by premixture with either the urea and/or sulfuric acid.

The thermally stable urea-sulfuric acid components also can be formed directly by the reaction of urea and sulfuric acid under substantially anhydrous conditions. Substantially anhydrous conditions can be achieved by employing anhydrous urea and sulfuric acid or by conducting the reaction in the presence of one or more of the chemical dehydrating agents referred to above in an amount sufficient to react with any water introduced into the system with the urea, sulfuric acid, or other components. Reaction temperature should be maintained at a level above the melting point of the urea-sulfuric acid component being produced (or above the melting point of the mixture or solution of that component when mixtures and/or solutions are being produced) and below the thermal decomposition temperature of the urea-sulfuric acid component.

As disclosed in my above referenced applications, the reaction of urea with sulfuric acid is highly exothermic, and adequate control of reaction temperature requires the removal of substantial amounts of heat from the reaction zone. Such heat removal can be achieved by one or more of several means. For instance, the reaction can be conducted in a reaction vessel emerged in an ice bath or a bath of ice and acetone. Other cooling procedures involve the use of cooling coils in the reaction vessel, the use of prechilled reactants, anhydrous solvents and/or diluents, the use of solvents and/or diluents which vaporize at the reaction temperature employed and thereby remove heat from the reaction, direct air cooling of the reaction mixture as described in my parent application Ser. No. 318,629, supra, including the direct injection of cooling air or other cooling gas into the reaction zone, and combinations of such procedures.

The urea-sulfuric acid reaction can be either batch or continuous. The procedures described in my parent application Ser. No. 318,629 are illustrative of suitable batch and continuous operations and involve the simultaneous addition of stoichiometric quantities of urea and sulfuric acid to the reaction zone. Heat can be removed by recirculating the reaction phase from the reaction zone to a cooler from which cooled material is returned to the reaction zone. In the alternative, the sulfuric acid can be added to the total amount of urea slowly and/or in small increments, and the resulting combination can be cooled either continuously or intermittently. Conversely, the urea can be slowly and/or intermittently added to the total quantity of sulfuric acid with either continuous or intermittent cooling.

I have also found that the described, anhydrous urea-sulfuric acid components can be formed directly by reacting urea and sulfuric acid in the presence of one or more anhydrous non-aqueous solvents such as those discussed above. This procedure can be employed to form solutions of the novel urea-sulfuric acid components in a non-aqueous solvent, or a mixture of such solvents, or to form solvent-free, thermally stable urea-sulfuric acid components. The solvent-free products can be obtained by evaporating the solvent from the solution following completion of the urea-sulfuric acid reaction or by crystallizing the urea-sulfuric acid component from the solution.

The urea-sulfuric acid reaction can be conducted in the anhydrous solvent under either batch or continuous conditions. Thus, the urea and sulfuric acid can be added simultaneously and continuously to the non-aqueous solvent by any one of a variety of procedures. Illustrative of such procedures are those discussed in my parent application Ser. No. 318,629, and which are referred to above. In the alternative, either the urea or sulfuric acid can be added incrementally and/or gradually to a solution of the other component in the selected non-aqueous solvent.

The solid, thermally stable urea-sulfuric acid components of this invention can be obtained by direct manufacture of the anhydrous urea-sulfuric acid component at a temperature above its melting point and cooling the resultant product, by crystallizing the urea-sulfuric acid component from its solution in water or a non-aqueous solvent, or by evaporating water or a non-aqueous solvent from a solution of the urea-sulfuric acid component in such materials. Preparation of the anhydrous, solid components from aqueous systems, either by crystallization or by evaporation, usually requires subsequent dehydration of the separated product by one or more of the procedures discussed above.

Anhydrous solutions of the novel urea-sulfuric acid components can be obtained by forming the urea-sulfuric acid component in the presence of one or more anhydrous, non-aqueous polar solvents or by dissolving the preformed liquid or solid component in one or more non-aqueous polar solvents.

Water can be extracted from urea-sulfuric acid components containing substantial amounts of water, e.g., 5 weight percent or more, by contacting the water-containing component with sufficient quantities of one or more highly hydrophyllic solvents. While single-stage extraction can be employed, multi-stage extraction is more efficient and is presently preferred. Three to about ten extraction steps or stages using about 1 to about 100 volumes of solvent per volume urea-sulfuric acid component per stage are usually adequate to reduce the water content of the composition to the required level of about 1 weight percent or less. Illustrative of suitable hydrophyllic solvents are dimethyl sulfoxide, absolute methanol, glycol, acetone, absolute ethanol, methylethyl ketone and other hydrophyllic substances. Since some of the solvents, e.g., acetone, glycol, and methanol, are also solvents for the urea-sulfuric acid component, it is necessary to use relatively low temperatures when extracting water from the urea-sulfuric acid components with those materials. The extraction temperature employed when using materials which are solvents for both the urea-sulfuric acid components and water should be sufficiently low to prevent solvation of excessive amounts of the urea-sulfuric acid components. The temperatures within the range of about $-20°$ C. to about $5°$ C. are generally effective for this purpose.

The thermal stability of the novel urea-sulfuric acid components of this invention, and of compositions containing such components, enables their use in all applications for which urea-sulfuric acid compositions are otherwise useful at temperatures which cannot be employed with the less stable urea-sulfuric acid compositions heretofore known. Thus, the novel urea-sulfuric acid components can be employed at temperatures above $80°$ C. and even above $100°$ C. without undergoing thermal decomposition. This characteristic of such compositions enables their use at such elevated temperatures, for instance, for the treatment of cellulosic compositions as described in my application Ser. No. 455,268, supra, the treatment of plant seeds as described in Ser. No. 455,317, supra, the treatment of wooded articles as described in Ser. No. 482,942, the control and elimination of nitrogen oxide emissions as described in Ser. No. 537,087, and as catalysts and/or catalyst components in a variety of acidcatalyzed reactions as described in Ser. No. 453,496, the disclosures of which are incorporated herein in their entirety. Such acid-catalyzed organic reactions involve the conversion of any organic materials that can be converted by sulfuric acid catalysts, and they include oxidation, particularly oxidative addition reactions; esterfication; trans-esterification; hydrogenation; isomerization, including racemization of optical isomers; hydrolysis and alcoholisis by reaction with water, alcohols, or thiols; alkylation; olefin polymerization; Friedel-Crafts reactions; demetalization; and nitration.

The invention is further described by the following examples which are illustrative of specific modes of practicing the invention and are not intended as limiting the scope of the invention as defind by the appended claims.

EXAMPLE 1

One kilogram of anhydrous diurea-sulfuric acid adduct is prepared by reacting anhydrous solid urea with chilled fuming sulfuric acid in a flask emersed in a dry ice bath. Four hundred and fifty grams of fuming sulfuric acid are placed in the flask suspended in the dry ice bath and are allowed to cool. 550 grams of anhydrous urea prills are then gradually added over a period of approximately 30 minutes while constantly monitoring the temperature of the reaction phase. The rate of urea addition is controlled to maintain a reaction-phase temperature of approximately $100°$ C. and the reaction phase is continuously stirred during the reaction. The resulting product contains less than 0.5 weight percent water, has a urea/sulfuric acid molar ratio of 2.0, contains approximately 55 weight percent urea and 45 weight percent sulfuric acid, and has a melting point of approximately $85°$ C.

Following completion of the reaction, the molten product is poured onto a tray and is allowed to solidify into a homogeneous white slab. This material is then remelted at $100°$ C. and droplets of the molten material are quenched a liquid nitrogen bath to form solid anhydrous prills.

There is no evidence of decomposition during any stage of the reaction or the post reaction treatment at $100°$ C. The reaction phase and remelted product remain clear, and there is no sign of effervescence which is characteristic of incipient decomposition. Thus, the incipient decomposition temperature of the anhydrous product is above $100°$ C.

EXAMPLE 2

The procedure described in Example 1 is repeated with the exception that 98 percent sulfuric acid, rather than fuming sulfuric acid, is employed as the sulfuric acid reactant. The use of the 98 percent sulfuric acid results in the presence of approximately one weight percent water in the product based on the combined weight of urea and sulfuric acid. The reacted urea-sulfuric acid product is solidified as described in Example 1, and its melting point is determined to be approximately 80° C. (The material was evidently impure, apparently due to the presence of water, and it melted over a relatively wide range e.g., approximately 15° C.)

The resulting solid product is placed in a vacuum desiccater and is exposed to a vacuum of 20 mm Hg. absolute for 16 hours. The resulting product has a sharp melting point of approximately 85° C. evidencing that the vacuum treatment is sufficient to remove residual water.

EXAMPLE 3

A urea-sulfuric acid formulation containing 39 weight percent urea, 55 weight percent sulfuric acid, and 6 weight percent water can be dehydrated to form a thermally stable product containing 41.3 weight percent urea, 58.2 weight percent sulfuric acid, and 0.5 weight percent water by vacuum evaporation followed by heating. The feed composition corresponds to the formulation 18-0-0-18 (18 weight percent nitrogen from urea and 18 weight percent sulfur from sulfuric acid) and to a urea/sulfuric acid molar ratio of 1.2.

Dehydration can be effected by exposing the feed composition to a vacuum of 20 mm Hg absolute for 16 hours at 60° C. after which the composition is gradually heated to 100° C. over a period of 2 hours.

EXAMPLE 4

A thermally stable urea-sulfuric acid composition can be prepared by dissolving 50 grams of urea in dimethylsulfoxide contained in a 2 liter flask immersed in an ice-acetone bath. Fifty grams of fuming sulfuric acid then can be gradually added over a period of 20 minutes with agitation to produce 100 grams of a thermally stable urea-sulfuric acid reaction product containing 50 weight percent urea and 50 weight percent sulfuric acid.

EXAMPLE 5

A thermally stable urea-sulfuric acid composition containing 44 weight percent urea and 44 weight percent sulfuric acid can be prepared by dissolving 10 grams of phosphoric acid containing 70 weight percent polyphosphoric acid in 52.6 grams of 95 percent sulfuric acid contained in a one liter flask immersed in an ice-acetone bath. Fifty grams of anhydrous urea is then added gradually with agitation over a period of 20 minutes.

EXAMPLE 6

A thermally stable urea-sulfuric acid composition can be prepared by mixing 50 grams of sulfur dichloride ($SCl_2$) with 100 grams of a preformed urea-sulfuric acid component containing 39 weight percent urea, 55 weight percent sulfuric acid, and 6 weight percent water.

While particular embodiments of this invention have been described, it will be understood, of course, that the invention is not limited thereto since many obvious modifications can be made, and it is intended to include within this invention any such modifications as will fall within this scope of the appended claims.

Having described my invention, I claim:

1. A thermally stable composition comprising urea and sulfuric acid which composition contains about 1 weight percent water or less based on the combined weight of said urea and said sulfuric acid.

2. The composition defined in claim 1 which contains about 0.5 weight percent water or less.

3. The composition defined in claim 1 which contains about 0.1 weight percent water or less.

4. The composition defined in claim 1 which contains no detectable quantity of water.

5. The composition defined in claim 1 which has an incipient decomposition temperature above 80° C.

6. The composition defined in claim 1 which comprises a reaction product of urea and sulfuric acid selected from the group consisting of the monourea adduct of sulfuric acid, the diurea adduct of sulfuric acid, and combinations thereof.

7. The composition defined in claim 1 comprising a reaction product of urea and sulfuric acid selected from the group consisting of the monourea adduct of sulfuric acid, diurea adduct of sulfuric acid, and combinations thereof, and said composition is free of decomposition products of urea formed in the reaction of said urea and said sulfuric acid.

8. The composition defined in claim 1 which comprises a chemical dehydrating agent.

9. The composition defined in claim 8 wherein said chemical dehydrating agent is selected from the group consisting of polyphosphoric acid, $SO_3$, ammonium polyphosphate, fuming sulfuric acid, sulfur monochloride, sulfur dichloride, thionyl chlorides, anhydrides, and combinations thereof.

10. The composition defined in claim 8 wherein said chemical dehydrating agent is selected from the group consisting of polyphosphoric acid, fuming sulfuric acid, $SO_3$, and combinations thereof.

11. The composition defined in claim 8 which comprises at least about 1 weight percent of said chemical dehydrating agent based on the combined weight of said urea and said sulfuric acid.

12. The composition defined in claim 1 which further comprises a surfactant.

13. The composition defined in claim 1 wherein said urea and said sulfuric acid, in combination, constitute at least about 50 weight percent of said composition.

14. The composition defined in claim 1 wherein said urea and sulfuric acid, in combination, constitute at least about 2 weight percent of said composition.

15. The composition defined in claim 1 wherein said urea and sulfuric acid constitute about 10 to 100 percent of said composition.

16. The composition defined in claim 1 wherein the molar ratio of said urea to said sulfuric acid is within the range of about 1/10 to about 10/1.

17. The composition defined in claim 1 having a urea/sulfuric acid molar ratio within the range of about ¼ to about 4/1.

18. The composition defined in claim 1 having a urea/sulfuric acid molar ratio of at least about 1/1.

19. The composition defined in claim 1 having a urea/sulfuric acid molar ratio of about ½ to about 3/2.

20. The composition defined in claim 1 which comprises a reaction product of urea and sulfuric acid selected from the group consisting of the monourea adduct of sulfuric acid, the diurea adduct of sulfuric acid, and combinations thereof, and less than 0.5 weight percent water, the molar ratio of said urea to said sulfuric acid is within the range of about 1/10 to about 10/1, and said composition has an incipient decomposition temperature of at least about 90° C.

21. The composition defined in claim 1 wherein the molar ratio of said urea to said sulfuric acid is at least about ½ and said composition comprises less than about 0.5 weight percent water and is characterized by an incipient decomposition temperature of at least about 100° C.

22. The composition defined in claim 1 wherein the molar ratio of said urea to said sulfuric acid is at least about 1/1, and said composition contains less than about 0.5 weight percent water and is characterized by an incipient decomposition temperature of at least about 100° C.

23. The composition defined in claim 22 wherein the molar ratio of said urea to said sulfuric acid is within the range of about 1/1 to about 10/1.

24. The composition defined in claim 1 which further comprises a chemical dehydrating agent and is characterized by an incipient decomposition temperature of at least about 100° C.

25. The composition defined in claim 1 which is free of any detectable amount of water, and which is characterized by an incipient decomposition temperature of at least 100° C.

26. The composition defined in claim 25 wherein the molar ratio of said urea to said sulfuric acid is at least about 1/1.

27. The composition defined in claim 1 which comprises a solution of said combination of said urea and said sulfuric acid in a nonaqueous solvent.

28. The composition defined in claim 1 which comprises a liquid combination of said urea and said sulfuric acid in which is dissolved at least about 1 weight percent of a solute.

29. The composition defined in claim 28 wherein said solute is selected from the group consisting of inorganic metal-containing compounds, phosphoric acid, polyphosphoric acid and combinations thereof.

30. A thermally stable composition comprising urea and sulfuric acid, which composition contains about 0.5 weight percent water or less based on the combined weight of said urea and said sulfuric acid.

31. A thermally stable composition comprising urea and sulfuric acid, which composition contains about 0.5 weight percent water or less, and in which the molar ratio of said urea to said sulfuric acid is within the range of about 1/10 to about 10/1.

32. A thermally stable composition comprising urea and sulfuric acid, which composition contains about 0.1 weight percent water or less, and in which the molar ratio of said urea to said sulfuric acid is at least about 1/1.

33. A thermally stable composition comprising urea, sulfuric acid, and a chemical dehydrating agent, which composition contains about 0.1 weight percent water or less.

34. A thermally stable composition comprising urea, sulfuric acid, and a chemical dehydrating agent selected from the group consisting of polyphosphoric acid, $SO_3$, ammonium polyphosphate, fuming sulfuric acid, sulfur monochloride, sulfur dichloride, thionyl chloride, organic anhydrides, and combinations thereof, which composition comprises about 0.1 weight percent or less water and in which the molar ratio of said urea to said sulfuric acid is at least about 1.

35. The composition defined in claim 34 wherein said chemical dehydrating agent is selected from the group consisting of polyphosphoric acid, fuming sulfuric acid, $SO_3$, and combinations thereof.

36. A thermally stable liquid composition comprising urea and sulfuric acid, which liquid composition contains at least one solute other than said urea and said sulfuric acid dissolved in said liquid, and which contains less than about 1 weight percent water or less based on the combined weight of said urea and said sulfuric acid.

37. The composition defined in claim 36 which comprises at least on polar inorganic solute.

38. The composition defined in claim 36 which comprises at least one solute selected from the group consisting of inorganic metal-containing compounds, phosphoric acid, polyphosphoric acid, and combinations thereof.

39. A thermally stable solid composition comprising urea, sulfuric acid, and a chemical dehydrating agent, which composition contains about 0.1 weight percent water or less and in which the molar ratio of said urea to said sulfuric acid is at least about 1/1.

40. The solid composition defined in claim 39 wherein said chemical dehydrating agent is selected from the group consisting of polyphosphoric acid, $SO_3$ ammonium polyphosphate, fuming sulfuric acid, sulfur monochloride, sulfur dichloride, thionyl chloride, organic anhydrides, and combinations thereof.

41. A thermally stable solid composition comprising urea and sulfuric acid, which composition contains about 0.1 weight percent water or less based on the combined weight of said urea and said sulfuric acid, and in which the molar ratio of said urea to said sulfuric acid is at least about 1/1.

42. The solid composition defined in claim 41 which further comprises a surfactant.

43. A method for forming thermally stable combinations of urea and sulfuric acid, which method comprises the steps of reacting substantially anhydrous urea and sulfuric acid, which urea and sulfuric acid, in combination, contain less than about 5 weight percent water based on the combined weight of said urea and sulfuric acid, maintaining the temperature of the combination of said urea and said sulfuric acid during said reaction at a level below the thermal decomposition temperature of said combination, and dehydrating the resulting combination of said urea and said sulfuric acid by an amount sufficient to reduce the water content of said combination to a level of about 1 weight percent or less.

44. The method defined in claim 43 wherein said substantially anhydrous urea and sulfuric acid, in combination, contain less than about 3 weight percent water.

45. The method defined in claim 43 wherein said substantially anhydrous urea and sulfuric acid, in combination, contain less than about 1 weight percent water.

46. The method defined in claim 43 wherein said resulting combination of said urea and said sulfuric acid is dehydrated by heating said combination to a temperature of at least about 100° C. during one or both of said reacting and dehydrating steps.

47. The method defined in claim 43 wherein said combination of said urea and said sulfuric acid is dehydrated, at least in part, by treating said resulting combination under vacuum.

48. The method defined in claim 43 wherein said combination of said urea and said sulfuric acid is dehydrated, at least in part, by mixing said combination with a chemical dehydrating agent.

49. The method defined in claim 48 wherein said chemical dehydrating agent is selected from the group consisting of polyphosphoric acid, $SO_3$, ammonium polyphosphate, fuming sulfuric acid, sulfur monochloride, sulfur dichloride, thionyl chlorides, organic anhydrides, and combinations thereof.

50. The method defined in claim 48 wherein said chemical dehydrating agent is selected from the group consisting of polyphosphoric acid, fuming sulfuric acid, $SO_3$, and combinations thereof.

51. The method defined in claim 43 which further comprises the step of contacting said urea and said sulfuric acid with an amount of a chemical dehydrating agent sufficient to reduce the water content of said combination of said urea and said sulfuric acid to a level of about 0.1 weight percent or less.

52. The method defined in claim 43 which comprises the further step of contacting said urea and said sulfuric acid with an amount of a chemical dehydrating agent in excess of a stoichiometric amount of said dehydrating agent required to react with the water contained in said urea and said sulfuric acid.

53. The method defined in claim 43 wherein said urea and said sulfuric acid are reacted in the presence of a chemical dehydrating agent.

54. The method defined in claim 53 wherein said chemical dehydrating agent is selected from the group consisting of polyphosphoric acid, $SO_3$, ammonium polyphosphate, fuming sulfuric acid, sulfur monochloride, sulfur dichloride, thionyl chlorides, organic anhydrides, and combinations thereof.

55. The method defined in claim 53 wherein said chemical dehydrating agent is selected from the group consisting of polyphosphoric acid, fuming sulfuric acid, $SO_3$, and combinations thereof.

56. The method defined in claim 53 wherein the concentration of said chemical dehydrating agent is sufficient to reduce the water content of said combination of said urea and said sulfuric acid to a level of about 0.1 weight percent of less.

57. The method defined in claim 53 wherein the concentration of said chemical dehydrating agent is in excess of the stoichiometric amount of said dehydrating agent required to react with the water contained in said urea and said sulfuric acid.

58. The method defined in claim 43 wherein said resulting combination of said urea and said sulfuric acid is dehydrated, at least in part, by extracting water therefrom with a hydrophilic solvent.

59. A method for forming a thermally stable reaction product of urea and sulfuric acid from an aqueous solution of a urea-sulfuric acid reaction product, which method comprises the steps of crystallizing said urea-sulfuric acid reaction product from said solution, separating the resulting crystallized reaction product from the resulting supernatant solution, and dehydrating the separated, crystallized reaction product by an amount sufficient to reduce its water content to a level of about 1 weight percent or less.

60. The method defined in claim 59 wherein said reaction product is dehydrated by an amount sufficient to reduce its water content to a level of about 0.5 weight percent of less.

61. The method defined in claim 59 wherein said reaction product is dehydrated by an amount sufficient to reduce its water content to a level of about 0.1 weight percent or less.

62. The method defined in claim 59 wherein said reaction product is dehydrated by an amount sufficient to reduce its water content to an undetectable level.

63. The method defined in claim 59 wherein said reaction product is dehydrated, at least in part, by treating said reaction product under vacuum.

64. The method defined in claim 59 wherein said reaction product is heated during said dehydration to a temperature of about 100° C. or more.

65. The method defined in claim 59 wherein said reaction product is dehydrated, at least in part, by mixing said crystallized reaction product with a chemical dehydrating agent.

66. The method defined in claim 65 wherein said chemical dehydrating agent is selected from the group consisting of polyphosphoric acid, $SO_3$, ammonium polyphosphate, fuming sulfuric acid, sulfur monochloride, sulfur dichloride, thionyl chlorides, organic anhydrides, and combinations thereof.

67. The method defined in claim 65 wherein the concentration of said chemical dehydrating agent mixed with said separated reaction product is in excess of the stoichiometric amount required to react with the water contained in said separated reaction product.

68. The method defined in claim 59 wherein said crystallized reaction product is dehydrated, at least in part, by extracting water therefrom with a hydrophilic solvent.

69. A method for forming thermally stable combinations of urea and sulfuric acid which method comprises the steps of reacting urea with sulfuric acid under substantially anhydrous conditions corresponding to less than about 1 weight percent water based on the combined weight of said urea and said sulfuric acid and maintaining the temperature of said combination of said urea and said sulfuric acid during said reaction at a level below the incipient decomposition temperature of said combination.

70. The method defined in claim 69 wherein said urea and sulfuric acid are reacted at a temperature of at least about 90° C.

71. The method defined in claim 69 wherein said urea and said sulfuric acid are reacted in the presence of a chemical dehydrating agent.

72. The method defined in claim 71 wherein said chemical dehydrating agent is selected from the group consisting of polyphosphoric acid, $SO_3$, ammonium polyphosphate, fuming sulfuric acid, sulfur monochloride, sulfur dichloride, thionyl chlorides, organic anhydrides, and combinations thereof.

73. The method defined in claim 69 which further comprises the step of mixing a chemical dehydrating agent with said combination of said urea and said sulfuric acid.

74. A method for forming thermally stable reaction products of urea and sulfuric acid, which method comprises the steps of reacting substantially anhydrous urea and sulfuric acid, which urea and sulfuric acid, in combination, contain less than about 0.1 weight percent water based on the combined weight of said urea and said sulfuric acid, and maintaining the temperature of the combination of said urea and said sulfuric acid during said reaction at a level below the incipient decomposition temperature of said combination.

75. The method defined in claim 74 wherein said reaction of said urea and said sulfuric acid is-conducted, at least in part, at a temperature of at least about 90° C.

76. A method for forming thermally stable reaction products of urea and sulfuric acid which method comprises the steps of reacting urea and sulfuric acid in the presence of an amount of a chemical dehydrating agent sufficient to maintain a free water content of less than about 1 weight percent water based on the combined weight of said urea and said sulfuric acid.

77. The method defined in claim 76 wherein said chemical dehydrating agent is selected from the group consisting of polyphosphoric acid, $SO_3$, ammonium polyphosphate, fuming sulfuric acid, sulfur monochloride, sulfur dichloride, thionyl chlorides, organic anhydrides, and combinations thereof.

78. A method for forming thermally stable combinations of urea and sulfuric acid from urea-sulfuric acid combinations containing more than about one weight percent water based on the combined weight of said urea and sulfuric acid, which method comprises the step of reducing the water content of said combination of said urea and said sulfuric acid to a level of about one weight percent or less based on the combined weight of said urea and sulfuric acid.

* * * * *